(12) United States Patent
Bertolini et al.

(10) Patent No.: US 11,932,388 B2
(45) Date of Patent: Mar. 19, 2024

(54) LEADING EDGE STRUCTURE FOR A FLOW CONTROL SYSTEM OF AN AIRCRAFT

(71) Applicant: Airbus Operations GmbH, Hamburg (DE)

(72) Inventors: Ivano Bertolini, Hamburg (DE); Stefano Giaquinto, Hamburg (DE); Sebastian Welz, Hamburg (DE); Nina Düren, Hamburg (DE); Jeff Wee Hong Yap, Hamburg (DE); Michael Höft, Hamburg (DE); Nicole Jordan, Hamburg (DE); Frank Nielsen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/581,640

(22) Filed: Jan. 21, 2022

(65) Prior Publication Data
US 2022/0234720 A1 Jul. 28, 2022

(30) Foreign Application Priority Data

Jan. 22, 2021 (DE) .................. 10 2021 101 444.1
Jun. 30, 2021 (DE) .................. 10 2021 116 932.1

(51) Int. Cl.
*B64C 3/28* (2006.01)
*B64C 3/18* (2006.01)
(Continued)

(52) U.S. Cl.
CPC .................. *B64C 3/28* (2013.01); *B64C 3/18* (2013.01); *B64C 5/06* (2013.01); *B64C 21/02* (2013.01)

(58) Field of Classification Search
CPC .... B64C 3/18; B64C 3/28; B64C 5/06; B64C 21/02
See application file for complete search history.

(56) References Cited

U.S. PATENT DOCUMENTS 9,511,848 B2 * 12/2016 Gerber .................. B64C 3/26
9,821,538 B1 * 11/2017 Harris .................. B64C 7/00
(Continued)

FOREIGN PATENT DOCUMENTS

CN 107082111 B * 12/2020 ........... B64C 1/0009
DE 1 266 136 4/1968
(Continued)

OTHER PUBLICATIONS

Machine Translation of CN-107082111-B, Klein M K, Dec. 2020, Year: 2020.*

(Continued)

*Primary Examiner* — Tien Q Dinh
*Assistant Examiner* — Katherine June Bolek
(74) *Attorney, Agent, or Firm* — Nixon & Vanderhye P.C.

(57) ABSTRACT

A leading edge structure (1) for a flow control system of an aircraft (101) including a double-walled leading edge panel (3) with a first side portion (11) extending to a first attachment end (17), a second side portion (13) extending to a second attachment end (19), an inner wall element (21) facing a plenum (7), an outer wall element (23) facing ambient flow (25), and a core assembly (97). The outer wall element (23) includes micro pores (31) and the inner wall element (21) includes openings (33) which form a fluid connection from ambient flow, through the core assembly (97) and to the plenum (7). The thickness of the outer wall element is reduced due to the first attachment end (17) and/or at the second attachment end (19) attached to the inner wall element (21) by both bonding and fasteners (85, 87, 89, 91).

19 Claims, 5 Drawing Sheets

(51) Int. Cl.
   *B64C 5/06*    (2006.01)
   *B64C 21/02*   (2006.01)

(56) References Cited

U.S. PATENT DOCUMENTS

2010/0077690 A1     4/2010   Durand
2019/0016444 A1*    1/2019   Schrauf .................... B64C 5/02

FOREIGN PATENT DOCUMENTS

| | | |
|---|---|---|
| DE | 10 2016 109 026 | 11/2017 |
| EP | 2 886 452 | 6/2015 |
| EP | 2 955 108 | 12/2015 |
| EP | 3 159 259 | 4/2017 |
| EP | 3 216 693 | 9/2017 |
| EP | 3 428 062 | 1/2019 |
| RU | 2 613 661 | 3/2017 |
| WO | 2012/028467 | 3/2012 |

OTHER PUBLICATIONS

Search Report for DE Application No. 10 2021 116 932.1 dated Dec. 9, 2021, 6 pages.
European Search Report cited in EP 22151860.8 dated May 25, 2022, 5 pages.
Search Report cited in EP 22152071.1 dated Jun. 1, 2022, 8 pages.

* cited by examiner

LEADING EDGE STRUCTURE FOR A FLOW CONTROL SYSTEM OF AN AIRCRAFT

RELATED APPLICATIONS

This application incorporates by reference and claims priority to German Patent Application DE 10 2021 101 444.1 filed Jan. 22, 2021, and German Patent Application DE 10 2021 116 932.1 filed Jun. 30, 2021.

BACKGROUND

The present invention relates to a leading edge structure for a flow control system of an aircraft, in particular for a Hybrid Laminar Flow Control (HLFC) system, where air is sucked in or blown out of a porous surface of a flow body in order to extend the region of laminar flow along the flow body. Further aspects of the present invention relate to a vertical tail plane comprising such a leading edge structure, and an aircraft comprising such a leading edge structure or such a vertical tail plane. Instead of to a vertical tail plane the leading edge structure might also be attached to a horizontal tail plane or to a wing.

The leading edge structure comprises a double-walled leading edge panel that surrounds a common plenum in a curved, i.e. arcuate, manner. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure, the first attachment end being configured for attachment to a further structure located downstream from the leading edge, such as a vertical tail plane box. Further, the leading edge panel has a second side portion opposite the first side portion, wherein the second side portion extends from the leading edge point to a second attachment end on a second side of the leading edge structure opposite the first side, the second attachment end being configured for attachment to a further structure downstream from the leading edge, such as a vertical tail plane box.

The leading edge panel comprises an inner wall element facing the plenum and spaced apart from the inner wall an outer wall element for contact with the ambient flow. Between the inner and outer wall elements the leading edge panel comprises a core assembly. The outer wall element comprises a plurality of micro pores, such as perforations, forming a fluid connection between the core assembly and the ambient flow. The inner wall element comprises openings forming a fluid connection between the core assembly and the plenum. The inner wall element may be made of fiber reinforced plastic (FRP) and the outer wall element may be made of titanium sheet.

Similar leading edge structures are known in the art. In some known leading edge structures the outer wall element is attached to the inner wall element in the area of the first and second attachment ends by fasters. In order for the outer wall element to be perforated with micro pores it is advantageous to have an outer wall element with a minimum thickness. However, the thickness of the outer wall element is limited by its post-buckling behavior. The smaller the thickness of the outer wall element the more it tends to buckle, in particular at the first and second attachment ends, where the outer wall element is attached to the inner wall element by fasteners. This buckling introduces high pull-out forces into the fasteners, which in turn limits the minimum thickness of the outer wall element.

SUMMARY OF INVENTION

Therefore, the present invention may be embodied to provide a leading edge structure that allows for a minimized thickness of the outer wall element. The leading edge structure may have a first attachment end and/or at the second attachment end of an outer wall element that attaches, e.g., directly, to an inner wall element by both bonding and/or fasteners, such as rivets, bolts, or lockbolts. The bonding inhibits buckling of the outer wall element at the first and second attachment ends, thereby decreasing the pull out loads of the fasteners, which in turn allows to minimize the thickness of the outer wall element. A minimum thickness of the outer wall element saves weight and simplifies introduction of the micro pores into the outer wall element.

The first attachment end and/or at the second attachment end the outer wall element may rest against the inner wall element along a common contact plane, e.g., in an overlapping, planar or layered manner. By such an areal connection a reliable attachment by bonding and fasteners is enabled.

At the first attachment end and/or at the second attachment end between the outer wall element and the inner wall element a bonding layer may be provided extending within the contact plane, e.g., only a bonding layer and no other structure. The bonding layer might be of various form and material and provides a reliable areal connection.

The bonding layer may be made of a film adhesive. This bonding material provides reliable adhesion between the FRP and titanium material of the inner and outer wall elements.

The bonding layer may have a thickness of between 0.1 millimeter (mm) and 0.2 mm, e.g., 0.1 mm. Such a thickness of the bonding layer provides adhesion for the inner and outer wall elements.

The bonding layer may have a peeling strength of at least 150 N/mm (newtons per mm), e.g., between 200 N/mm and 250 N/mm. The peeling strength is measured by coupon test. In such a way, pull out loads of the fasteners can be reliably reduced.

At the first attachment end and/or at the second attachment end a plurality of fasteners may extend through both the outer wall element and the inner wall element, as they are resting against one another, as well as through the bonding layer in between the inner and outer wall elements. The fasteners may be arranged in one or more lines of fasteners extending in the span direction. The fasteners together with the bonding layer provide a reliable hybrid connection between the first and second wall elements.

The outer wall element may extend from the first attachment end to the second attachment end. In this way, a leading edge structure with a one-step, continuous and smooth flow surface is provided that does not form an obstacle for ambient flow streaming along the flow surface and, thus, decreases drag and increases flow efficiency of the leading edge structure. Further, the area of the micro pores can be extended further downstream closer to the attachment ends, thereby increasing the overall flow control effectivity. Moreover, the leading edge structure can be optimized in terms of weight and costs since the outer wall element also supports the attachment ends.

The core assembly may comprises a plurality of elongate stiffeners connecting the inner and outer wall elements and spaced apart from one another, so that between each pair of adjacent stiffeners a hollow chamber is formed between the inner and outer wall elements. The stiffeners may be formed from FRP integrally with the inner wall element. The plurality of micro pores form a fluid connection between the hollow chambers and the ambient flow, while the openings form a fluid connection between the hollow chambers and the plenum. Each hollow chamber may comprise at least one opening. Such stiffeners and hollow chambers form a simple and effective core assembly through which air flow can pass during suction or blowing operation.

The outer wall element may form a first end edge at the first attachment end and a second end edge at the second attachment end. The first end edge and/or second end edge may extend in parallel to the leading edge and may be formed to extend along or rest against a vertical tail plane box of a related vertical tail plane. This means, the outer wall element extends as far as or even further downstream as the inner wall element at the first attachment end and/or at the second attachment end. In such a way, a full outer coverage of the leading edge structure by outer wall element is achieved.

The first end edge and/or the second end edge may extend in parallel to at least one of and possibly all of the stiffeners. This means, the end edges extend in span direction. In such a way, the end edges can continuously abut a vertical tail plane box when the leading edge structure is attached to a vertical tail plane.

The outer wall element may comprises a main wall portion as well as a first wall extension and/or a second wall extension. The main wall portion includes the leading edge point. The first wall extension includes the first attachment end and may include the first end edge. The second wall extension includes the second attachment end and may include the second end edge. In such a way, the outer wall element might be formed by connecting the first and second wall extensions to the main wall portion, so that for the main wall portion a titanium sheet might be used with a width as available on the marked, while the remaining width required to cover the full leading edge panel from the first attachment end to the second attachment end can be covered by the first and second wall extensions.

The first wall extension may be connected to the main wall portion such via a straight first welding seam. Alternatively or additionally, the second wall extension is connected to the main wall portion via a welding seam, e.g., a straight second welding seam. First and/or second welding seams may be butt-welded seams, e.g., formed by laser welding. Other forms of welding or alternative forms of connection of the main wall portion to the first and/or second wall extensions are also possible.

The first welding seam and/or the second welding seam may be dressed, at least at the outer flow surface in contact with the ambient flow, to form a smooth transition between the main wall portion and the first wall extension and/or between the main wall portion and the second wall extension. In such a way, the first and second welding seams do not form a flow obstacle and laminar flow across the welding seams is possible.

The first welding seam, e.g., the entire first wall extension, may be attached, e.g., bonded, directly and planar to the inner wall element with no core assembly in between. Additionally or alternatively, the second welding seam, e.g., the entire second wall extension, is attached, e.g., bonded, directly and planar to the inner wall element with no core assembly in between. In such a way, the first and second welding seams are sufficiently supported by the inner wall element, wherein the bonding may form an additional load path. No micro pores may be present in the first and/or second wall extensions.

The micro pores may be present in the main wall portion, e.g., only in the main wall portion, and are distributed from the leading edge point to the first welding seam and/or to the second welding seam, e.g., with a minimum distance from the welding seams. In such a way, the entire main wall portion can be used for flow control, thereby increasing overall flow control efficiency of the leading edge structure. A minimum distance of the micro pores from the first and/or second welding seam may be kept to avoid welding influence on the micro pores.

The stiffeners, in particular at least some of the stiffeners, are formed integrally with the inner wall element. Integrally in this connection is to be understood as formed in one piece that is not separable or mounted together from separate components. Such a leading edge structure with stiffeners formed integrally with the inner wall element represents a very simple and light weight construction, since fasteners, such as bolts or rivets, can be avoided. Also, the mechanical properties are improved, so that material and, once again, weight can be saved. Additionally, manufacturing can be simplified and expedited, as the inner wall element can be formed together with the stiffeners in one common process step, e.g. by Resin Transfer Molding (RTM).

The leading edge structure further may comprise a back wall, in particular a membrane of CFRP material. The back wall may connect the first attachment end to the second attachment end of the leading edge panel, thereby enclosing the plenum together with the leading edge panel on a side opposite the leading edge point.

The openings may be formed as throttle holes having a predefined diameter adapted for a predefined mass flow rate through the throttle holes in order to achieve a predefined fluid pressure in the hollow chambers. In such a way, the mass flow rate through the micro pores can be controlled by the fluid pressure in the hollow chambers and, thus, by the predefined diameter of the throttle holes. Alternatively, the openings might also be formed such that they allow an uncontrolled mass flow rate and are not adapted to control the fluid pressure in the hollow chambers, for example by a number of bores or by one large diameter hole. In this case, the fluid pressure in the hollow chambers corresponds to the fluid pressure in the plenum, so that the mass flow rate through the micro pores can be controlled only by the fluid pressure in the plenum. Whether the openings are formed as throttle hole or as simple openings not adapted for a specific mass flow rate, may vary from chamber to chamber.

The stiffeners may have a solid cross section with a square or trapezoid shape. In such a way, the stiffeners provide plane support surfaced for the inner and outer walls elements.

The stiffeners may extend in the span direction, e.g. in parallel to the leading edge point, and e.g., in parallel to one another. In such a way, the stiffeners may have a long extension.

The inner wall element may be formed of a Fiber Reinforced Plastic (FRP) material, e.g., from a Carbon Fiber Reinforced Plastic (CFRP) material. Further, the stiffeners might be formed as sandwich structures, each sandwich structure comprising a core element enveloped on opposite sides by separate layers of FRP of the inner wall element. In other words, the inner wall element splits up in two separate layers. One layer encloses the core element on the side facing the plenum, and thus forms the inner wall element in the region of the stiffeners. The other layer encloses the core element on the side facing the outer wall element or resting against the outer wall element. This layer may be formed in an omega shape, i.e. has an omega-shaped cross section. In such a way, a simple, strong and light weight integral construction of the inner wall element and the stiffeners is provided.

The core elements may be formed of a foam material. Foam has a high stiffness at a low weight.

A plurality of support ribs, i.e. frames, may be attached to the inner wall element in such a way that they face the plenum and extend across, e.g., perpendicular to, the span direction along the inner wall element. The support ribs stiffen the leading edge structure across the span direction.

The support ribs may be formed integrally with the inner wall element. In such a way, the inner wall element can be formed as one piece together with both the stiffeners and the support ribs. This further simplifies the entire leading edge structure and reduces additional weight.

The support ribs may be formed of FRP. This allows that the support ribs can easily be formed integrally with the inner wall element.

The outer wall element may formed as a titanium sheet. Such titanium sheet provides the strength and stiffness required for the outer surface along the leading edge.

The outer wall element may comprise multiple sections, when viewed from a leading edge downstream, i.e. in a chord direction. The porosity varies from one section to another in terms of pore diameter and/or pore pitch. In particular, the diameter decreases and the pitch increasing from the leading edge downstream. In such a way, the mass flow rate of the air sucked in or blown out can be adapted to the demand. For example, in sections close to the leading edge point, where a higher mass flow rate is demanded, the pore diameter might be larger and/or the pore pitch might be smaller than in sections further downstream.

A further aspect of the present invention may be embodied in a vertical tail plane for an aircraft. The vertical tail plane comprises a vertical tail plane box and a leading edge structure according to any of the afore-described embodiments. The vertical tail plane box has a first lateral panel with a first attachment portion and an opposite second lateral panel with a second attachment portion. Both the first attachment portion and the second attachment portion extend in the span direction. The first attachment end is attached to the first attachment portion, such that the first end edge extends along, may rest against, the first attachment portion, and the second attachment end is attached to the second attachment portion, such that the second end edge extends along, may rest against, the second attachment portion, so that the first side portion of the leading edge panel forms a continuous, e.g., smooth, flow surface with the first lateral panel of the vertical tail plane box, and the second side portion of the leading edge panel forms a continuous, e.g. smooth, flow surface with the second lateral panel of the vertical tail plane box. The plenum may be in fluid connection with an air outlet, such as an adjustable outlet flap with a rear-facing opening, for causing a vacuum in the plenum to draw ambient air through the micro pores and the hollow chambers into the plenum. Further the plenum may be in fluid connection with an air inlet, such as an adjustable inlet flap with a forward-facing opening, for causing an overpressure in the plenum to blow out air from the plenum through the hollow chambers and the micro pores to the ambient. The air outlet and the air inlet may be provided in a cover panel on one side or on opposite sides of the vertical tail plane. The vertical tail plane may further comprise a connection duct connecting a lower end of the plenum to the air outlet and/or to the air inlet. The above explanations with respect to the leading edge structure apply vis-à-vis to the vertical tail plane.

The first attachment end may be attached to the first attachment portion by a first front line of fasteners extending through the main wall portion, and by a first rear line of fasteners extending through the first wall extension, so that the first welding seam extends between the first front line of fasteners and the first rear line of fasteners. Additionally or alternatively, the second attachment end is attached to the second attachment portion by a second front line of fasteners extending through the main wall portion, and by a second rear line of fasteners extending through the second wall extension, so that the second welding seam extends between the second front line of fasteners and the second rear line of fasteners. The fasteners can be e.g. bolts, lockbolts and rivets. In such a way, the main wall portion and the first and second wall extensions are each secured to the first attachment portion and the second attachment portion, respectively, by at least one line of fasteners, so that the first welding seam and the second welding seam, respectively, are not necessarily required for structural integrity of the outer wall element.

The first front line of fasteners and/or the second front line of fasteners may extend through a back wall connecting the first attachment end to the second attachment end of the leading edge panel, to attach the back wall to the leading edge panel. A flange of the back wall may rest against an inner surface of the inner wall element in an overlapping manner. Additionally or alternatively, the first rear line of fasteners extend through the first attachment portion of the vertical tail plane box to attach the vertical tail plane box to the leading edge panel. The first attachment portion may rest against the inner surface of the inner wall element in an overlapping manner. Additionally or alternatively, the second rear line of fasteners extend through the second attachment portion of the vertical tail plane box to attach the vertical tail plane box to the leading edge panel. The second attachment portion may rest against the inner surface of the inner wall element in an overlapping manner. In such a way, the back wall and/or the vertical tail plane box can be attached to the leading edge panel by the same fasteners used to attach the inner and outer wall element to one another.

Yet a further aspect of the present invention may relate to an aircraft comprising a leading edge structure according to any of the afore-described embodiments, or comprising a vertical tail plane according to any of the afore-described embodiments. The above explanations with respect to the leading edge structure and the vertical tail plane apply vis-à-vis to the aircraft.

Yet a further aspect of the present invention may relate to a method for manufacturing a leading edge structure according to any of the afore-described embodiments comprising the following steps: The inner wall element and the core assembly is produced, wherein the stiffeners and the inner wall element are formed together as an integral part by a Resin Transfer Molding (RTM) process, in particular by a common RTM step. The support ribs may be formed as an integral part together with the inner wall element and the stiffeners by an RTM process. Further, the outer wall element is produced. Then, the outer wall element is connected, e.g., bonded, to the core assembly and/or to the inner wall element, wherein the outer wall element may be bonded against the stiffeners and against the inner wall element at the first and/or second attachment ends. At the first and second attachment ends, the inner and outer wall elements are additionally attached to one another by fasteners, such as rivets bolts, or lockbolts. The above explanations with respect to the leading edge structure also apply to the present method.

The outer wall element may be produced using the following steps: The main wall portion is provided, such as formed by a titanium sheet of 1.25 meter (m) width and 1 mm thickness. The first wall extension and/or the second wall extension are provided, e.g. titanium sheets of 0.125 m width each and 1 mm thickness. Then, the main wall portion is welded, e.g., butt-welded, to the first wall extension to form the first welding seam, and/or to the second wall extension to form the second welding seam, e.g., by laser welding. By butt-welding the main wall portion to the first and/or second wall extensions a reliable and smooth connection between these parts can be produced.

The first welding seam and/or the second welding seam may subsequently be dressed, at least at the outer flow surface in contact with the ambient flow, to form a smooth transition between the main wall portion and the first wall extension and/or between the main wall portion and the second wall extension. In such a way, the welding seams do not form an obstacle to the ambient flow thereby allowing a laminar flow along the flow surface.

The following steps may be carried out to produce the outer wall element: First, a blank of the main wall portion is provided. Then, the micro pores are produced in the blank after which it is sanded and etched. Subsequently, the first and/or second wall extensions are provided and welded to the main wall portion to form the first and/or second welding seams. After welding the first and/or welding seams are dressed to form a smooth and continuous surface. Finally, the outer wall element is formed, in particular bent, to the final curved shape of the leading edge.

SUMMARY OF DRAWINGS

Embodiments of the invention are illustrated in the drawings which are.

DETAILED DESCRIPTION

Figure 1:
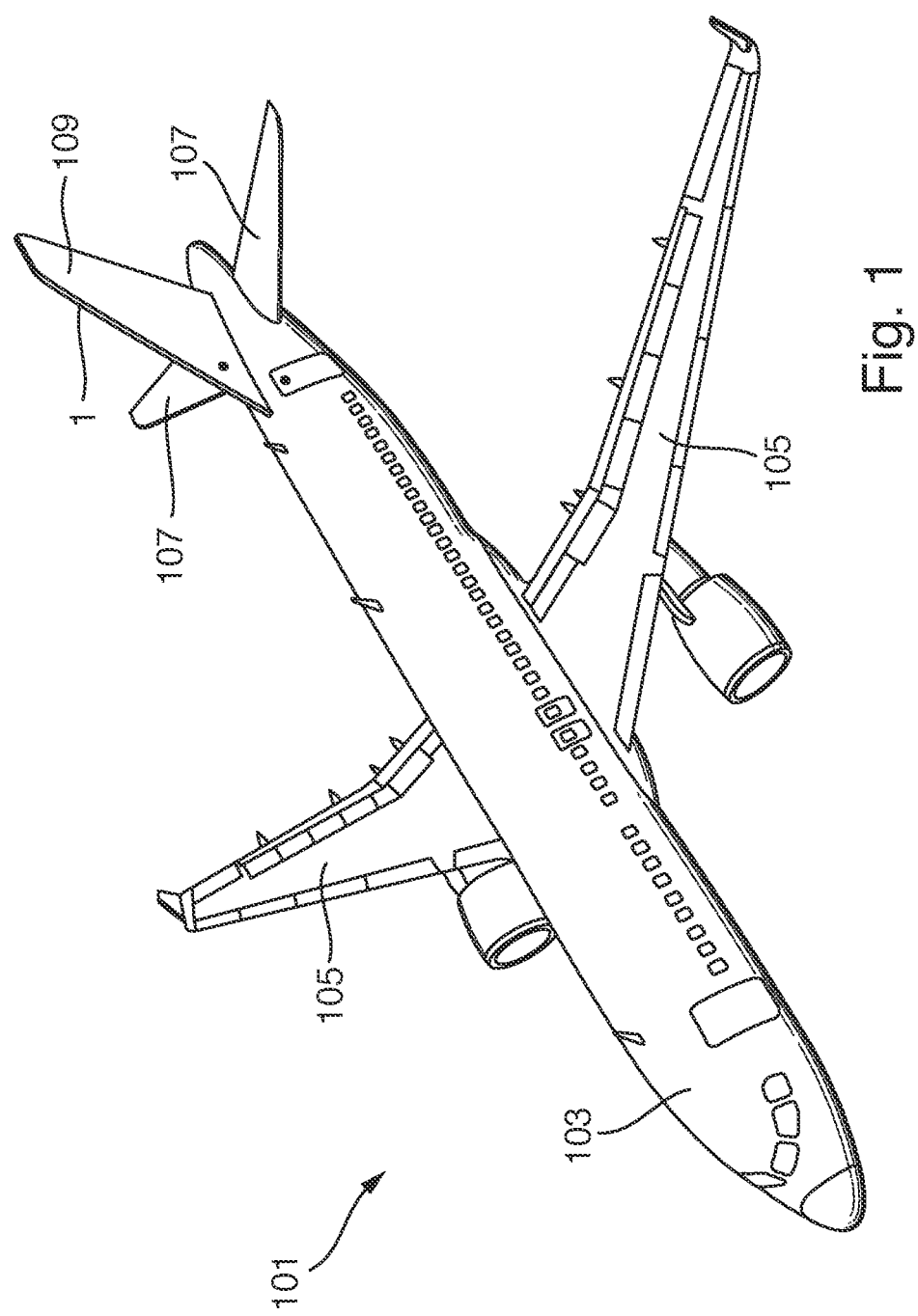
FIG. 1 is a perspective view of an aircraft.

In FIG. 1 an aircraft 101 according to an embodiment of the present invention is shown. The aircraft comprises a fuselage 103, wings 105, a horizontal tail plane 107, and a vertical tail plane 109 according to an embodiment of the invention. The vertical tail plane 109 is shown in more detail in FIG. 9. The vertical tail plane 109 comprises a leading edge structure 1 according to an embodiment of the invention. Various embodiments of the leading edge structure 1 are shown in more detail in FIGS. 2 to 8.

Figure 2:
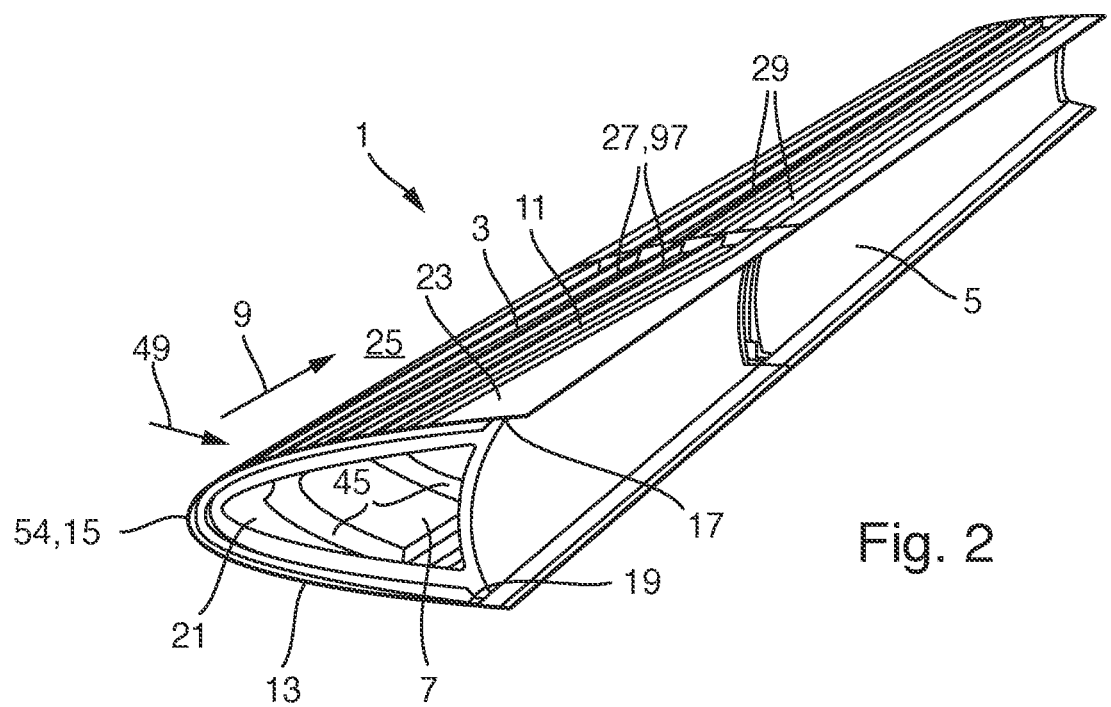
FIG. 2 is a perspective cut open view of an embodiment of a leading edge structure according to an embodiment of the invention.
Figure 3:
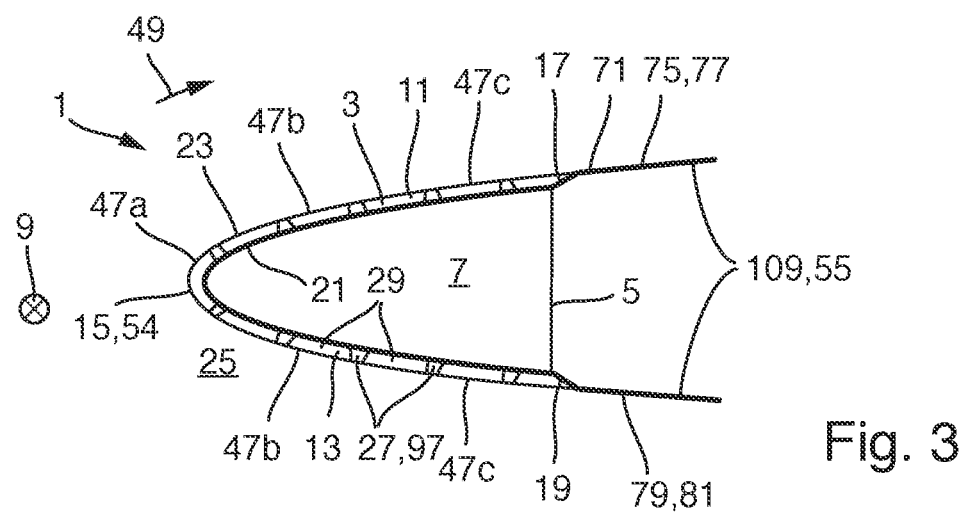
FIG. 3 is a cross sectional view across the span direction of the leading edge structure shown in FIG. 2.

In FIGS. 2 and 3 an embodiment of a leading edge structure 1 for a flow control system of an aircraft according to the present invention is shown. The leading edge structure 1 comprises a double-walled leading edge panel 3 and a back wall 5.

Figure 4:
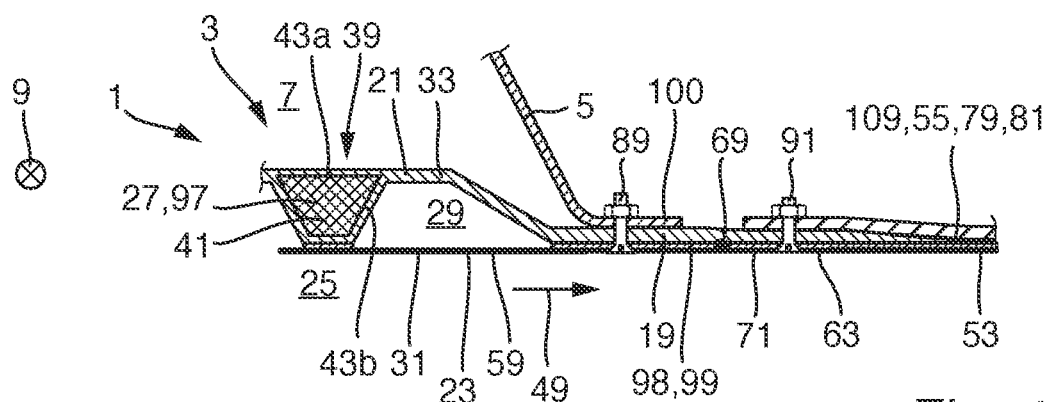
FIG. 4 is a detailed view of the second attachment end of the leading edge structure shown in FIG. 3.

The leading edge panel 1 surrounds a plenum 7 in a curved manner, wherein the plenum 7 extends in a span direction 9. The leading edge panel 3 has a first side portion 11 and an opposite second side portion 13. The first side portion 11 extends from a leading edge point 15 to a first attachment end 17. The second side portion 13 extends from the leading edge point 15 to a second attachment end 19, as shown in FIG. 4.

The back wall 5 is formed as a membrane of CFRP material and connects the first attachment end 17 to the second attachment end 19 of the leading edge panel 3. In such a way, the back wall 5 encloses the plenum 7 together with the leading edge panel 3 on a side opposite the leading edge point 15.

Figure 5:
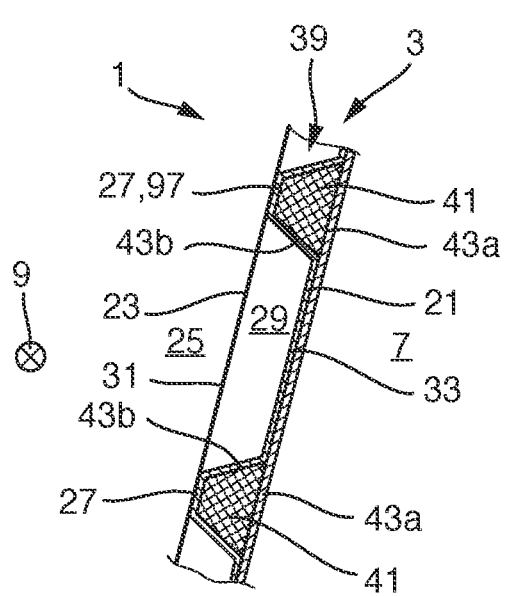
FIG. 5 is a detailed view of a hollow chamber of the leading edge structure shown in FIG. 3.

The leading edge panel 3 comprises an inner wall element 21 facing the plenum 7 and an outer wall element 23 in contact with an ambient flow 25. Between the inner and outer wall elements 21, 23 the leading edge panel 3 comprises a core assembly 97 comprising a plurality of elongate stiffeners 27 spaced apart from one another, so that between each pair of adjacent stiffeners 27 a hollow chamber 29 is left open between the inner and outer wall elements 21, 23, as shown in FIG. 5. The stiffeners 27 extend in the span direction 9 in parallel to the leading edge point 15 and in parallel to one another.

Figure 6:
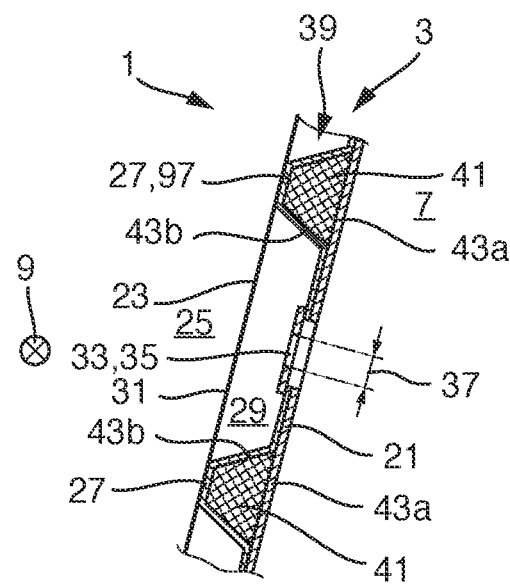
FIG. 6 is a detailed view of another hollow chamber of the leading edge structure shown in FIG. 3, wherein the inner wall element has an opening formed as a throttle hole.

The outer wall element 23 comprises a plurality of micro pores 31 forming a fluid connection between the hollow chambers 29 and the ambient flow 25. The inner wall element 21 comprises openings 33 forming a fluid connection between the hollow chambers 29 and the plenum 7. At some of the hollow chambers 29, the openings 33 are formed as throttle holes 35 having a predefined diameter 37 adapted for a predefined mass flow rate through the throttle holes 35 in order to achieve a predefined fluid pressure in the hollow chambers 29, as it is shown in FIG. 6. However, at others of the hollow chambers 29, the openings 33 are formed to allow a random mass flow rate and are not adapted to control the fluid pressure in the hollow chambers 29, as it is the case in the hollow chamber 29 shown in FIG. 5.

The stiffeners 27 are formed integrally with the inner wall element 21. The inner wall element 21 is formed of a Carbon Fiber Reinforced Plastic (CFRP). The stiffeners 27 have a solid trapezoid-shaped cross section and are formed as sandwich structures 39. Each sandwich structure 39 comprises a core element 41 enveloped on opposite sides by first and second separate layers 43a, 43b of CFRP of the inner wall element 21, wherein one layer 43a encloses the core element 41 on the side facing the plenum 7, while the other layer 43b encloses the trapezoid surface of the core element 41 on the side facing the outer wall element 23 by an omega-shape curse. The core elements 41 are formed of a foam material.

As shown in FIG. 2, a plurality of support ribs 45 are attached to the inner wall element 21 in such a way that they face the plenum 7 and extend perpendicular to the stiffeners 27 and to the span direction 9 along the inner wall element 21. The support ribs 45 are formed integrally with the inner wall element 21 and are also formed of a CFRP material.

The outer wall element 23 is formed as a titanium sheet and comprises multiple sections 47a, 47b, 47c arranged subsequently in a chord direction 49. The porosity varies from one section 47a to another section 47b, 47c in terms of the pore pitch, wherein the pore pitch increases from the leading edge point 15 downstream.

Figure 7:
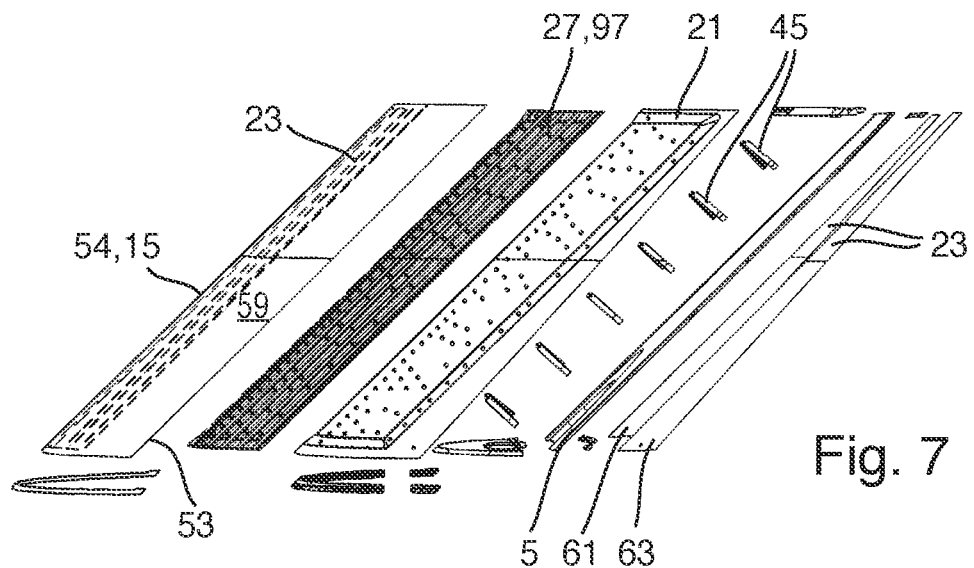
FIG. 7 is an exploded view of the leading edge structure shown in FIG. 3.
Figure 8:
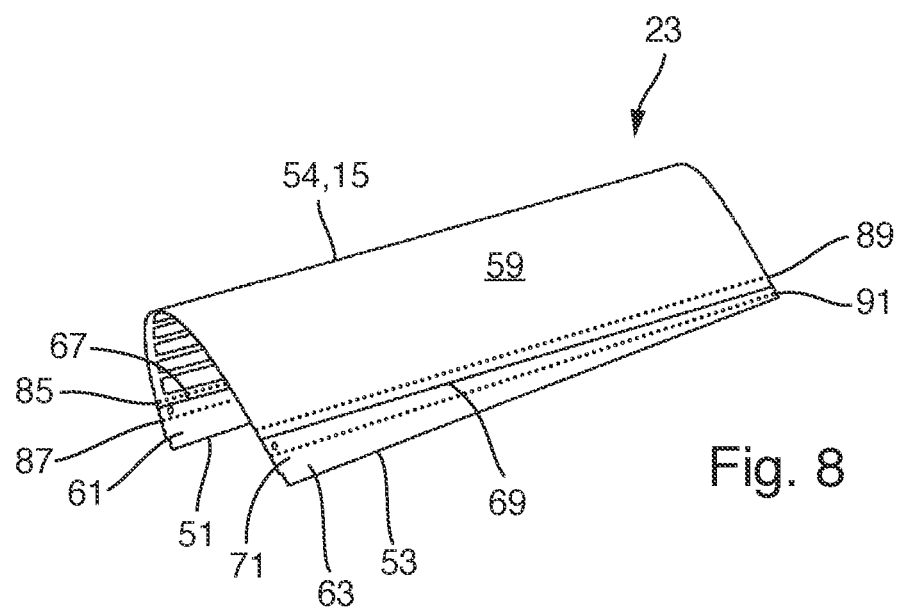
FIG. 8 is a perspective view of the outer wall element of the leading edge structure shown in FIG. 7, indicating the first and second welding seams.

As shown in FIGS. 4, 7 and 8, the outer wall element 23 extends from the first attachment end 17 to the second attachment end 19. The outer wall element 23 forms a first end edge 51 at the first attachment end 17 and a second end edge 53 at the second attachment end 19. The first end edge 51 and the second end edge 53 extend in parallel to the leading edge 54 and are formed to extend along or rest against a vertical tail plane box 55 of the associated vertical tail plane 109. This means, the outer wall element 23 extends as far as the inner wall element 21 at the first attachment end 17 and at the second attachment end 19. The first end edge 51 and the second end edge extend 53 in parallel to the stiffeners 27. This means, the end edges 51, 53 extend in span direction 9.

The outer wall element 23 comprises a main wall portion 59 as well as a first wall extension 61 and a second wall extension 63. The main wall portion 59 includes the leading edge point 15. The first wall extension 61 includes the first attachment end 17 and the first end edge 51. The second wall extension 63 includes the second attachment end 19 and the second end edge 53. As shown in FIGS. 7 and 8, the first wall extension 61 is connected to the main wall portion 59 via a straight first welding seam 67. Additionally, the second wall extension 63 is connected to the main wall portion 59 via a straight second welding seam 69. First and second welding seams 67, 69 are butt-welding seams formed by laser welding. The first welding seam 67 and the second welding seam 69 are dressed at the outer flow surface 71 to form a smooth transition between the main wall portion 59 and the first wall extension 61 and between the main wall portion 59 and the second wall extension 63.

As shown in FIG. 4, the first welding seam 67 and the entire first wall extension 61 are bonded directly and planar to the inner wall element 21 with no core assembly 97 in between. Additionally, the second welding seam 69 and the entire second wall extension 63 are bonded directly and planar to the inner wall element 21 with no core assembly 97 in between. A bonding layer 98 extends directly between the inner and outer wall elements 21, 23 within a contact plane 99 at the first and second attachment ends 17, 19. No micro pores 31 are present in the first and second wall extensions 61, 63. As indicated in FIG. 7, the micro pores 31 are present only in the main wall portion 59 and are distributed from the leading edge point 15 to the first welding seam 67 and to the second welding seam 69 with a minimum distance from the welding seams 67, 69.

As also shown in FIG. 4, at the first attachment end 17 and at the second attachment end 19 the outer wall element 23 is additionally attached to the inner wall element 21 by fasteners 85, 87, 89, 91, i.e. bolts, rivets or lockbolts, so that at the first and second attachment ends 17, 19 the outer wall element 23 is attached to the inner wall element 21 by both bonding layer 98 and fasteners 85, 87, 89, 91. At the first attachment end 17 and at the second attachment end 19 the outer wall element 23 rests against the inner wall element 21 along the common contact plane 99 in an overlapping and planar manner, wherein within the contact plane 99 the bonding layer 98 is provided. The bonding layer 98 is made of film adhesive, has a thickness of between 0.1 and 0.2 mm, and has a peeling strength in the range above 150 N/mm.

Figure 9:
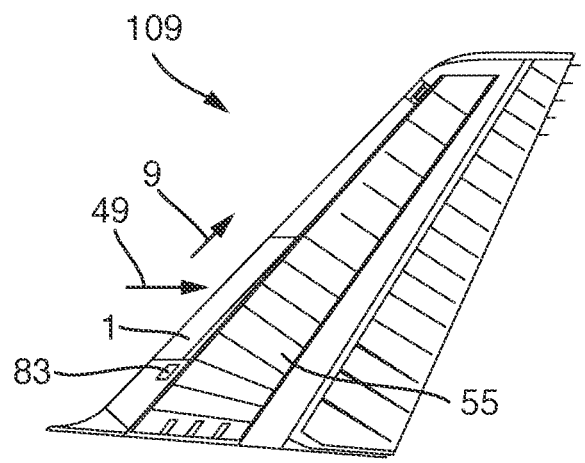
FIG. 9 is a side view of a vertical tail plane for an aircraft comprising the leading edge structure shown in FIG. 2.
Figure 10:
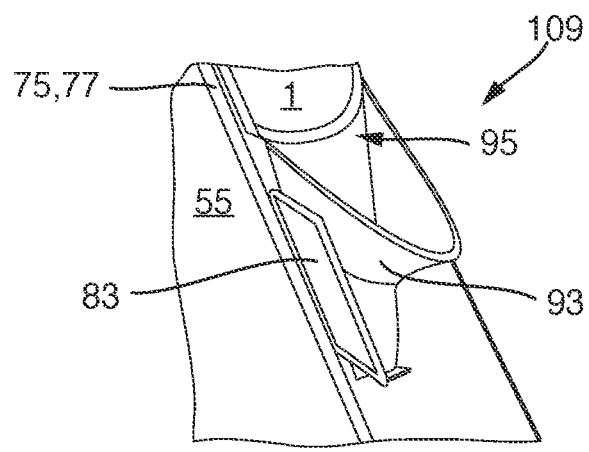
FIG. 10 is a detailed perspective view of a connection duct of the vertical tail plane shown in FIG. 9.
Figure 11:
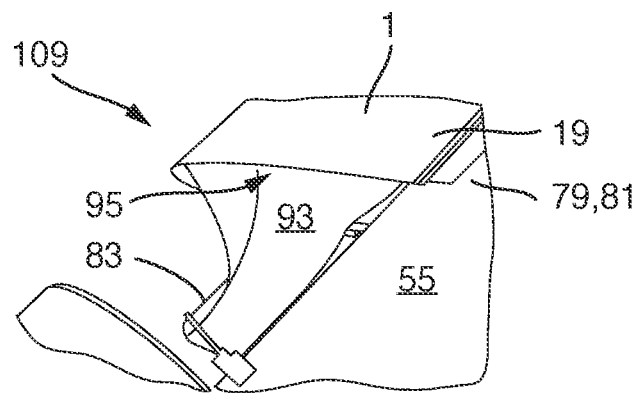
FIG. 11 is another perspective view of the connection duct shown in FIG. 10.

FIGS. 9 to 11 show a vertical tail plane 109 for an aircraft 101 according to the invention. The vertical tail plane 109 comprises a vertical tail plane box 55 and a leading edge structure 1 as described before. The vertical tail plane box 55 has a first lateral panel 75 with a first attachment portion 77 and an opposite second lateral panel 79 with a second attachment portion 81. The first attachment end 17 of the leading edge panel 3 is attached to the first attachment portion 77 such that the first end edge 51 extends along the first attachment portion 77, and the second attachment end 19 of the leading edge panel 3 is attached to the second attachment portion 81 such that the second end edge 53 extends along the second attachment portion 81. The first side portion 11 of the leading edge panel 3 forms a continuous flow surface 71 with the first lateral panel 75 of the vertical tail plane box 55, and the second side portion 13 of the leading edge panel 3 forms a continuous flow surface with the second lateral panel 79 of the vertical tail plane box 55. The plenum 7 is in fluid connection with an air outlet 83 for causing a vacuum in the plenum 7 to draw air from the ambient flow 25 through the micro pores 31 and the hollow chambers 29 into the plenum 7.

As shown in FIGS. 4 and 8, the first attachment end 17 is attached to the first attachment portion 77 by a first front line of fasteners 85 extending through the main wall portion 59, and by a first rear line of fasteners 87 extending through the first wall extension 61, so that the first welding seam 67 extends between the first front line of fasteners 85 and the first rear line of fasteners 87. Additionally, the second attachment end 19 is attached to the second attachment portion 81 by a second front line of fasteners 89 extending through the main wall portion 59, and by a second rear line of fasteners 91 extending through the second wall extension 63, so that the second welding seam 69 extends between the second front line of fasteners 89 and the second rear line of fasteners 91. The fasteners 85, 87, 89, 91 can be e.g. bolts, lockbolts, rivets.

The first front line of fasteners and/or the second front line of fasteners may extend through a back wall connecting the first attachment end to the second attachment end of the leading edge panel, to attach the back wall to the leading edge panel. A flange of the back wall may rest against an inner surface of the inner wall element in an overlapping manner. Additionally or alternatively, the first rear line of fasteners extend through the first attachment portion of the vertical tail plane box to attach the vertical tail plane box to the leading edge panel. The first attachment portion may rest against the inner surface of the inner wall element in an overlapping manner. Additionally or alternatively, the second rear line of fasteners extend through the second attachment portion of the vertical tail plane box to attach the vertical tail plane box to the leading edge panel. The second attachment portion may rest against the inner surface of the inner wall element in an overlapping manner. In such a way, the back wall and/or the vertical tail plane box can be attached to the leading edge panel by the same fasteners used to attach the inner and outer wall element to one another.

As shown in FIG. 4, the first front line of fasteners 85 and the second front line of fasteners 89 extend through the back wall 5 connecting the first attachment end 17 to the second attachment end 19 of the leading edge panel 3, to attach the back wall 5 to the leading edge panel 3. A flange 100 of the back wall 5 rests against an inner surface of the inner wall element 21 in an overlapping manner. Additionally, the first rear line of fasteners 87 extend through the first attachment portion 77 of the vertical tail plane box 55 to attach the vertical tail plane box 55 to the leading edge panel 3. The first attachment portion 77 rests against the inner surface of the inner wall element 21 in an overlapping manner. Additionally, the second rear line of fasteners 91 extend through the second attachment portion 81 of the vertical tail plane box 55 to attach the vertical tail plane box 55 to the leading edge panel 3. The second attachment portion 81 rests against the inner surface of the inner wall element 21 in an overlapping manner.

As shown in FIGS. 10 and 11, the vertical tail plane 109 further comprises a connection duct 93 connecting a lower end 95 of the plenum 7 to the air outlet 83. In addition to the air outlet flap 83 the plenum 7 might also be in fluid connection with an air inlet (not shown) for causing an overpressure in the plenum 7 to blow out air from the plenum 7 through the hollow chambers 29 and the micro pores 31 to the ambient flow 25.

The leading edge structure 1 shown in FIGS. 2 to 8 can be manufactured by a method including the following steps: The inner wall element 21 and the core assembly 97 is produced, wherein the stiffeners 27 and the inner wall element 21 are formed together as an integral part by a Resin Transfer Molding (RTM) process in a common RTM step. Also the support ribs 45 are formed as an integral part together with the inner wall element 21 and the stiffeners 27 by an RTM process. Further, the outer wall element 23 is produced. Then, the outer wall element 23 is bonded to the core assembly 97 and to the inner wall element 21, wherein the outer wall element 23 is bonded against the stiffeners 27 and against the inner wall element 21 at the first and second attachment ends 17, 19.

The outer wall element 23 is produced comprising the following steps: The main wall portion 59 is provided, which is formed by a titanium sheet of 1.25 m width and 1 mm thickness. The first wall extension 61 and the second wall extension 63 are provided in the form of titanium sheets of 0.125 m width each and 1 mm thickness. Then, the main wall portion 59 is butt-welded to the first wall extension 61 to form the first welding seam 67, and to the second wall extension 63 to form the second welding seam 69, by laser welding. The first welding seam 67 and the second welding seam 69 are subsequently dressed at the outer flow surface 71 to form a smooth transition between the main wall portion 59 and the first wall extension 61 and between the main wall portion 59 and the second wall extension 63.

By the leading edge structure 1 according to the present invention as described above, the bonding layer 98 inhibits a buckling of the outer wall element 23 at the first and second attachment ends 17, 19, thereby essentially decreasing the pull out loads of the fasteners 85, 87, 89, 91, which in turn allows to minimize the thickness of the outer wall element 23. A minimum thickness of the outer wall element 23 saves weight and simplifies introduction of the micro pores 31 into the outer wall element 23.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge structure for a flow control system of an aircraft comprising:
 a double-walled leading edge panel that surrounds a plenum in a curved manner, the plenum extending in a span direction of the leading edge structure;
 wherein the double-walled leading edge panel has a first side portion extending from a leading edge point to a first attachment end,
 wherein the double-walled leading edge panel has a second side portion opposite the first side portion, extending from the leading edge point to a second attachment end,
 wherein the double-walled leading edge panel comprises an inner wall element facing the plenum and an outer wall element for contact with an ambient flow,
 wherein between the inner and outer wall elements the double-walled leading edge panel comprises a core assembly,
 wherein the outer wall element comprises a plurality of micro pores forming a fluid connection between the core assembly and the ambient flow,
 wherein the inner wall element comprises openings forming a fluid connection between the core assembly and the plenum,
 wherein at the first attachment end and/or at the second attachment end the outer wall element is attached to the inner wall element by both bonding and fasteners,
 wherein a back wall forms a back of the plenum and spanning between the first side portion and the second side portion, and
 wherein the fasteners attach the back wall to the outer wall element and the inner wall element at the first attachment end and/or the second attachment end.

2. The leading edge structure according to claim 1, wherein at the first attachment end and/or at the second attachment end of the outer wall element rests against the inner wall element along a common contact plane.

3. The leading edge structure according to claim 2, wherein at the first attachment end or at the second attachment end between the outer wall element and the inner wall element a bonding layer is provided extending within the contact plane.

4. The leading edge structure according to claim 3, wherein the bonding layer is made of film adhesive.

5. The leading edge structure according to claim 3, wherein the bonding layer has a thickness in a range of 0.1 mm to 0.2 mm.

6. The leading edge structure according to claim 3, wherein the bonding layer has a peeling strength of at least 150 N/mm.

7. The leading edge structure according to claim 1, wherein the outer wall element extends from the first attachment end to the second attachment end.

8. The leading edge structure according to claim 1, wherein the core assembly comprises a plurality of elongate stiffeners spaced apart from one another, so that between each pair of adjacent stiffeners a hollow chamber is formed between the inner and outer wall elements,
 wherein the plurality of micro pores form a fluid connection between the hollow chambers and the ambient flow, and wherein the openings form a fluid connection between the hollow chambers and the plenum.

9. The leading edge structure according to claim 8, wherein the outer wall element forms a first end edge at the first attachment end and a second end edge at the second attachment end.

10. The leading edge structure according to claim 9, wherein the first end edge and/or the second end edge are parallel to at least one of the stiffeners.

11. The leading edge structure according to claim 1, wherein the outer wall element comprises a main wall portion and a first wall extension and a second wall extension,
wherein the main wall portion includes the leading edge point,
wherein the first wall extension includes the first attachment end, and
wherein the second wall extension includes the second attachment end.

12. The leading edge structure according to claim 11, wherein the first wall extension is connected to the main wall portion via a first welding seam, and
wherein the second wall extension is connected to the main wall portion via a second welding seam.

13. The leading edge structure according to claim 12, wherein the first welding seam and/or the second welding seam are dressed to form a smooth transition between the main wall portion and the first wall extension and/or between the main wall portion and the second wall extension.

14. The leading edge structure according to claim 12, wherein the first welding seam is attached directly to the inner wall element, and/or
wherein the second welding seam is attached directly to the inner wall element.

15. The leading edge structure according to claim 12, wherein the micro pores are present in the main wall portion and are distributed from the leading edge point to the first welding seam and/or to the second welding seam.

16. A vertical tail plane configured for an aircraft comprising:
a vertical tail plane box including a first lateral panel with a first attachment portion and an opposite second lateral panel with a second attachment portion,
a leading edge structure including:
a plenum extending in a span direction of the vertical tail plane;
a double-walled leading edge panel at least partially surrounding the plenum, wherein the double-walled leading edge panel includes:
an inner wall element facing the plenum;
an outer wall element configured to be in contact with an ambient flow over the vertical tail plane;
a core assembly between the inner wall element and the outer wall element;
micro-pores in the outer wall element;
openings in the inner wall element, wherein air from the ambient flow flows through the micro-pores, the core assembly, the openings and into the plenum;
a first side portion of the double-walled leading edge panel extends from a leading edge point to a first attachment end, wherein the first attachment end includes the inner wall element and the outer wall element; and
a second side portion of the double-walled leading edge panel is opposite the first side portion, and extends from the leading edge point to a second attachment end, wherein the second attachment end includes the inner wall element and the outer wall element, and at the first attachment end and/or at the second attachment end the outer wall element attaches to the inner wall element by both bonding and fasteners; and
a back wall forming a back of the plenum and spanning between the first side portion and the second side portion, wherein the fasteners attach the back wall to at least one of the first attachment and the second attachment;
wherein the first attachment end is attached to the first attachment portion, and the second attachment end is attached to the second attachment portion, and
wherein the first side portion of the leading edge panel forms a continuous flow surface with the first lateral panel of the vertical tail plane box, and the second side portion of the leading edge panel forms a continuous flow surface with the second lateral panel of the vertical tail plane box.

17. The vertical tail plane according to claim 12, wherein the first attachment end is attached to the first attachment portion by a first front line of the fasteners extending through the main wall portion, and by a first rear line of the fasteners extending through the first wall extension, so that the first welding seam extends between the first front line of the fasteners and the first rear line of the fasteners, and/or
wherein the second attachment end is attached to the second attachment portion by a second front line of the fasteners extending through the main wall portion, and by a second rear line of the fasteners extending through the second wall extension, so that the second welding seam extends between the second front line of the fasteners and the second rear line of the fasteners.

18. The vertical tail plane according to claim 17, wherein the first front line of the fasteners and/or the second front line of the fasteners extend through the back wall connecting the first attachment end to the second attachment end of the leading edge panel, to attach the back wall to the leading edge panel, and
wherein the first rear line of the fasteners extend through the first attachment portion of the vertical tail plane box to attach the vertical tail plane box to the leading edge panel and/or the second rear line of the fasteners extend through the second attachment portion of the vertical tail plane box to attach the vertical tail plane box to the leading edge panel.

19. An aircraft comprising a leading edge structure according to claim 1.

* * * * *